Feb. 24, 1948.  J. H. SHEETS  2,436,612

SEALED PROPELLER HUB ARRANGEMENT

Filed Oct. 28, 1942

INVENTOR
Jack H. Sheets.
BY
ATTORNEY

Patented Feb. 24, 1948

2,436,612

UNITED STATES PATENT OFFICE 2,436,612

SEALED PROPELLER HUB ARRANGEMENT

Jack H. Sheets, Verona, N. J., assignor to Curtiss-Wright Corporation, a corporation of Delaware Application October 28, 1942, Serial No. 463,644

3 Claims. (Cl. 170—162)

1

This invention relates to sealing means for preventing the escape of lubricating material from the interior of the hub forming a support for an airplane propeller blade.

In accordance with the invention, a propeller blade is rotatably supported in the tubular section of a propeller hub by means comprising a sleeve arrangement formed from substantially duplicate, separable sections which, throughout a part of their length, engage each other at diametrically opposite sides, the engaging surfaces terminating in narrow slots respectively, and this sleeve arrangement, the shank of the propeller blade and said hub tubular section being sealed in a novel manner to prevent the escape of lubricating material as specified.

Various other objects and advantages of the invention will become apparent from the following detailed description.

The invention resides in the sealed propeller hub arrangement, sealing means and combinations of the character hereinafter described and claimed.

For an understanding of the invention and for an illustration of one of the forms thereof, reference is to be had to the accompanying drawing, in which.

Figures 1, 2:
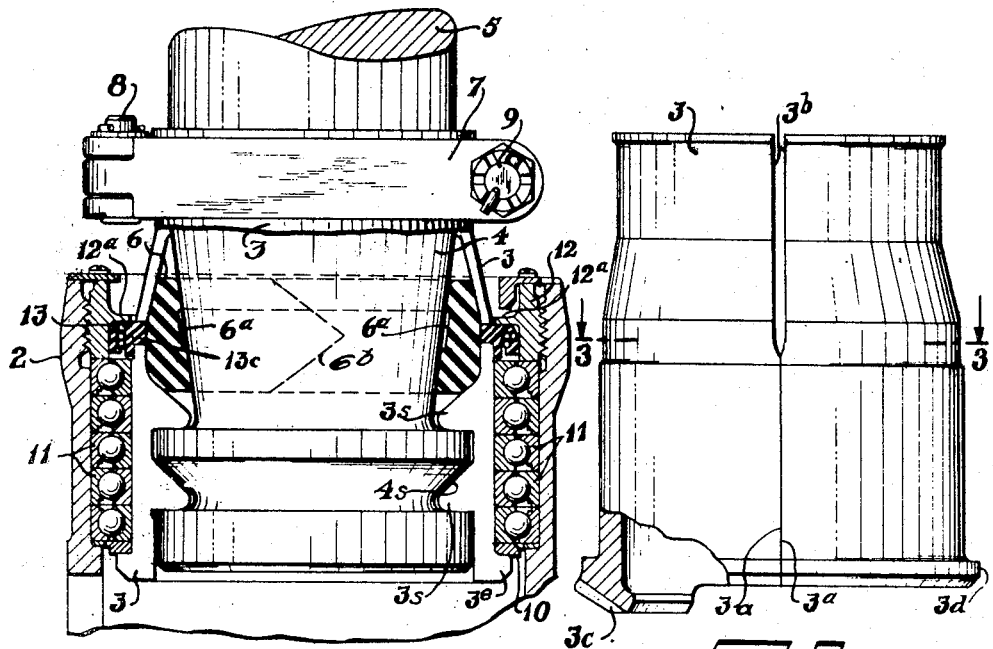
Figure 1 is a vertical sectional view, partly in elevation, showing the sealing arrangement of the invention.
Fig. 2 is an elevational view, partly broken away, showing the duplicate sleeve sections per se in assembled relation.

The hub herein referred to forms a support for a plurality of angularly related airplane propeller blades, said hub being shown as comprising a tubular socket or section 2 forming the direct support for one of said propeller blades. As known in the art, a split tubular sleeve 3 is utilized for securing the shank 4 of one well known form of propeller blade 5 to the hub 2. This tubular sleeve 3 is formed from substantially duplicate, complementary sections which engage each other along the medial longitudinal surfaces 3a and 3a, these engaging surfaces terminating in the respective diametrically opposite slots 3b, 3b. The aforesaid slots 3b, 3b, are formed by the undercut portion of each of the aforesaid surfaces 3a

2 and 3a, in order that the split sleeve 3, when assembled as in Fig. 1, may be brought into intimate clamping engagement with the shank surface of the blade 5 by means of a locking or clamping ring hereinafter described.

Figure 3:
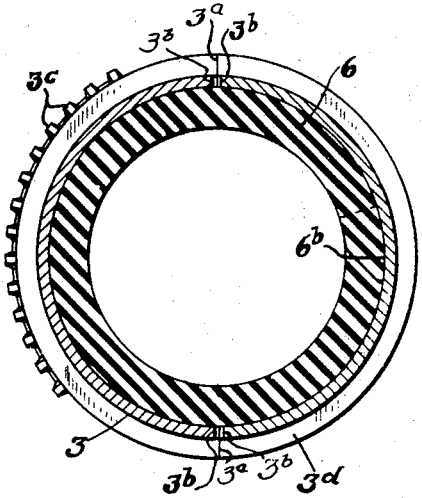
Fig. 3 is a horizontal sectional view, partly in plan, taken on the line 3—3 of Fig. 2 looking in the direction of the arrows.

As shown in Fig. 1, the sleeve 3 comprises a plurality of annular flanges presenting shoulder surfaces 3s which engage corresponding shoulder surfaces 4s formed on the root end of the propeller shank 4. In accordance with the invention, a resilient ring structure 6, which may be recessed as indicated at 6a, is disposed around said shank 4 and caused to engage an interior area of the sleeve 3. As shown in Fig. 3, the ring structure 6 is provided with a slit 6b which, circumferentially of said ring structure 6, is of V-shaped configuration, said slit 6b being provided so that the ring structure 6 may be opened and disposed around the shank 4.

The upper end of the sleeve 3 carries a split clamping ring 7 which comprises a plurality of sections pivoted together at 8, these sections being secured together in clamping relation by the bolt-and-nut arrangement shown at 9.

One element of the split sleeve 3 includes a lower gear segment 3c utilizable as hereinafter described. In addition, the sleeve 3 comprises a lower flanged surface 3d upon which a spacing ring 10 seats, a plurality of anti-friction devices 11 being stacked upon the ring 10 and filling the space between adjacent surfaces of said sleeve 3 and the tubular extension 2. A nut member 12, threaded into the tubular section 2, coacts with the uppermost anti-friction device 11 and said nut member 12 comprises a flanged section 12a which engages the upper surface of a resilient sealing ring 13 formed and utilizable as hereinafter described.

Figure 4:
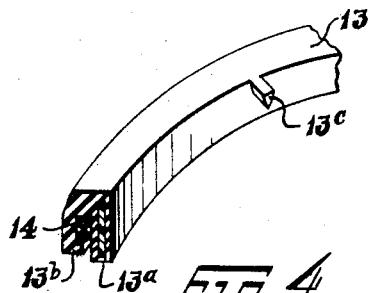
Fig. 4 is a perspective view illustrating a feature of the invention.

In accordance with the invention, the resilient sealing ring 13 comprises a molded member formed preferably of synthetic rubber in the form of concentric inner and outer band sections 13a, 13b spaced from each other and extending in the same axial direction, the outer band section being biased from the inner band section by one or more expansible wire devices 14 comprising endless, coiled spring wire rings. The inner band section 13b of said sealing ring is preferably internally reinforced, as hereinafter described, and molded with a pair of diametrically opposite inwardly extending projections 13c, 13c, as clearly shown in Fig. 4, which are disposed in the respective slots 3b, 3b at the bottom thereof to prevent lubricant from passing into said slots.

In order to assemble the apparatus illustrated in Fig. 1, the nut member 12, the sealing ring 13, the anti-friction devices 11 and the ring 10 are passed, in the order named, onto the bare propeller shank 4 and then beyond the same onto the lower end of the propeller blade 5.

Thereupon, the resilient ring structure 6 is opened at its split ends 6b and disposed in its intended position around the propeller shank 4 whereupon the separable sections of the sleeve 3 are associated with said propeller shank 4 and the resilient ring structure 6.

At this time, the ring 10, the anti-friction devices 11, the sealing ring 13 and the nut member 12 are associated in proper relation with the sleeve 3, the inwardly extending projections 13c, 13c seating in the respective slots 3b, 3b at the bottom thereof. Finally, the clamping ring 7 is associated with the upper end of the sleeve 3 and secured in clamping relation with respect thereto by the bolt-and-nut arrangement 9.

After completion of the assembling operation described above, the resultant assembly is passed into the tubular section 2 whereupon the nut member 12 is threaded in the upper internally threaded surface thereof so as to take the position indicated in Fig. 1. As a result, under the control of the flange 12a formed on the nut member 12, the projections 13c, 13c are caused to occupy, in sealing relation, the respective slots 3b, 3b at the bottom thereof. Further, due particularly to the inherent resiliency of the ring structure 6, sealed joints are formed between the engaging surfaces of said ring structure 6 and the respective projections 13c, 13c. Still further, the resilient ring structure 6 is held under compression in engagement with the propeller shank 4 and the sleeve 3, and the wire device 14 functions to hold the outer band section 13b in sealing engagement with the adjacent interior surface of the nut member 12.

The gear segment 3c of the sleeve 3 engages a gear, not shown, disposed interiorly of the described propeller hub, this gear arrangement being provided, as well understood in the art, for changing the pitch of the propeller blade 5.

The aforesaid hub together with its tubular section 2 including the area of the latter occupied by the anti-friction devices 11 contains lubricating material which tends to escape from its intended location during normal rotative movement of the propeller system. By the invention herein disclosed, the escape of such lubricating material is prevented and, in this connection, it will be noted that, (1) the resilient ring structure 6 seals a circular area on the interior surface of the sleeve 3, (2) said resilient ring structure 6 seals a plurality of circular areas on the exterior surface of the propeller shank 4, (3) said resilient ring structure 6, due to its inherent resiliency, seats against and seals the adjacent surfaces of the respective projections 13c, 13c, (4) the projections 13c, 13c seal the respective sets of engaging surfaces 3a, 3a of the sleeve 3, and (5) the ring 13 at its inner band section 13a engages, in sealing relation, with the adjacent surface of the sleeve 3 and said sealing ring 13, at its outer band section 13b engages, in sealing relation, with the adjacent surface of the nut member 12 to thereby seal the space above the uppermost anti-friction device 11. Accordingly, by the invention, various paths along which lubricating material might otherwise escape are sealed by the novel arrangements described above.

The ring structure 6 and the ring 13 are constructed from material suitable for the intended purpose as will be understood by those skilled in the art. In general, artificial rubber of suitable character forms material suitable for the construction of the ring structure 6, the outer ring section 13b and the projections 13c, 13c.

The inner band section 13a of the sealing ring 13 should be relatively stiff whereas the outer ring section 13b should be relatively flexible. Resin-treated cloth which is heat-resistant to a suitable degree may be used for the formation of the core of the inner band section 13a while the outer ring section 13b comprises suitable synthetic rubber as described above.

Figure 5:
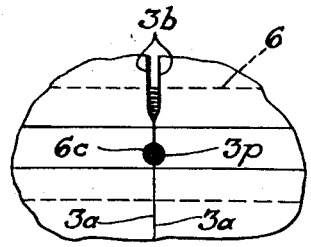
Fig. 5 is a fragmentary elevational view of a modification of the invention.

In accordance with the invention as hereinbefore described, the inwardly extending projections 13c, 13c are formed integrally with the sealing ring 13. The invention is not to be thus limited however because, as shown in Fig. 5, the split ring structure 6, may be provided at diametrically opposite points on its outer periphery with integral projections 6c of circular configuration as shown, in lieu of the wedge shape projections 13c formed on the sealing ring 13.

With such an arrangement, the sleeve 3 shown in Fig. 2 may be modified by lengthening the sets of sleeve engaging surfaces 3a, 3a with consequent shortening of the narrow slots 3b, 3b. The sleeve as thus modified, in the area thereof engaged by the inner band section 13a of the sealing ring 13, is provided with diametrically arranged circular passages 3p, 3p which are disposed somewhat below the lower ends of the respective slots 3b, 3b and which, during the assembling operation, receive the aforesaid circular projections 6c, 6c formed on said split ring structure 6. With this modified arrangement, the ends of said circular projections 6c, 6c are disposed in sealing relation with the respective plain adjacent surfaces of the inner band section 13a of the sealing ring 13 by the inherent resiliency of said ring structure 6. Further, said circular projections 6c, 6c engage the surfaces defining the respective passages 3p, 3p in sealing relation whereby the respective sleeve engaging surfaces 3a, 3a are sealed in an effective manner.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a blade receiving hub socket, a blade journalling assembly including a blade shank, a split flexible ring disposed about said shank, a split bearing sleeve comprising complementary half sections embracing said split ring and said shank, the engaging surfaces of said sleeve being undercut for a portion of their length to provide diametrically opposite slots therein, a second ring associated with said assembly comprising a resilient member having diametrically opposite inwardly extending projections thereon positioned about said sleeve with said projections disposed in said slots, blade retention means threaded in said socket, and means disposed about the slotted portion of said sleeve clamping said sleeve to said blade shank.

2. In combination, a blade receiving hub socket, a blade journalling assembly including a blade shank, a split flexible ring disposed about said shank, a split bearing sleeve comprising complementary half sections embracing said split ring and said shank, the engaging surfaces of said sleeve being undercut for a portion of their length to provide diametrically opposite slots therein, a second ring associated with said assembly comprising a resilient member having diametrically opposite inwardly extending projections thereon positioned about said sleeve with said projections disposed in said slots and engaging the adjacent surface of said split ring, blade retention means threaded in said socket, and means disposed about the slotted portion of said sleeve clamping said sleeve to said blade shank.

3. In combination, a blade receiving hub socket, a blade journalling assembly including a blade shank, a split flexible ring disposed about said shank, a split bearing sleeve comprising complementary half sections embracing said split ring and said shank, the engaging surfaces of said sleeve being undercut for a portion of their length to provide diametrically opposite slots therein, a second ring associated with said assembly comprising a resilient member having diametrically opposite inwardly extending projections thereon positioned about said sleeve with said projections disposed in the bottom of said slots and engaging the adjacent surface of said split ring, blade retention means threaded in said socket, and means disposed about the slotted portion of said sleeve clamping said sleeve to said blade shank.

JACK H. SHEETS.

REFERENCES CITED

The following references are of record in the file of this patent:

UNITED STATES PATENTS

| Number | Name | Date |
|---|---|---|
| 1,160,284 | Headly | Nov. 16, 1915 |
| 1,903,029 | Damsel | Mar. 28, 1933 |
| 1,951,321 | Blanchard | Mar. 13, 1934 |
| 1,982,162 | Havill | Nov. 27, 1934 |
| 2,008,682 | Christenson | July 23, 1935 |
| 2,017,505 | Meon | Oct. 15, 1935 |
| 2,033,342 | Lansing et al. | Mar. 10, 1936 |
| 2,046,817 | Geil et al. | July 7, 1936 |
| 2,009,046 | Fons | July 23, 1938 |
| 2,147,336 | Fedden et al. | Feb. 14, 1939 |
| 2,152,805 | Hoffmann | Apr. 4, 1939 |
| 2,162,104 | Mosher | June 13, 1939 |
| 2,249,141 | Johnson | July 15, 1941 |
| 2,316,713 | Procter | Apr. 13, 1942 |
| 2,318,486 | Hoover | May 5, 1943 |
| 2,342,458 | Davies | Feb. 22, 1944 |
| 2,370,913 | Procter | Mar. 6, 1945 |
| 2,379,302 | Hoover | June 26, 1945 |

FOREIGN PATENTS

| Number | Country | Date |
|---|---|---|
| 485,102 | Great Britain | May 13, 1939 |
| 544,904 | Great Britain | May 1, 1942 |